United States Patent
Franko, Sr.

(10) Patent No.: US 6,881,459 B2
(45) Date of Patent: Apr. 19, 2005

(54) LABEL HAVING AN INTEGRAL EXTENSION TUBE AND METHOD OF MANUFACTURE THEREOF

(76) Inventor: Joseph D. Franko, Sr., 15411 Terrace Rd., Ham Lake, MN (US) 55304

(*) Notice: Subject to any disclaimer, the term of this patent is extended or adjusted under 35 U.S.C. 154(b) by 78 days.

(21) Appl. No.: 10/194,755

(22) Filed: Jul. 12, 2002

(65) Prior Publication Data

US 2004/0009316 A1 Jan. 15, 2004

(51) Int. Cl.[7] .................................................. B32B 1/08
(52) U.S. Cl. ........................ 428/36.9; 428/40.1; 428/43; 428/343; 283/62; 283/81
(58) Field of Search ..................... 428/40.1, 43, 343, 428/36.9; 283/81, 62

(56) References Cited

U.S. PATENT DOCUMENTS

| | | |
|---|---|---|
| 4,592,572 A | 6/1986 | Instance |
| 4,744,161 A | 5/1988 | Instance |
| 4,849,043 A | 7/1989 | Instance |
| 4,850,613 A | 7/1989 | Instance |
| 4,856,257 A | 8/1989 | Romagnoli |
| 4,903,458 A | 2/1990 | Hakansson |
| 4,933,043 A | 6/1990 | Instance |
| 5,222,766 A | 6/1993 | Instance |
| RE34,366 E | 9/1993 | Instance |
| 5,264,265 A | 11/1993 | Kaufmann |
| D356,248 S | 3/1995 | Wilkinson |
| 5,621,368 A | 4/1997 | Galloway |
| 5,785,803 A | 7/1998 | Schiessl |
| 5,788,129 A | 8/1998 | Markos |
| 6,213,185 B1 | 4/2001 | Asghar et al. |
| 2004/0009316 A1 * | 1/2004 | Franko ................... 428/36.9 |

OTHER PUBLICATIONS

"Use It or Lose It", Energy Release Products Corporation, Trade Publication, one page.*

* cited by examiner

*Primary Examiner*—Daniel Zirker
(74) *Attorney, Agent, or Firm*—Walter K. Roloff

(57) ABSTRACT

A label having an integral extension tube includes a top ply and a base ply, each having perimeter edges. The perimeter edges of each ply are substantially coupled together in such a manner that a chamber is formed within the label, for integrally providing an extension tube there within.

10 Claims, 8 Drawing Sheets

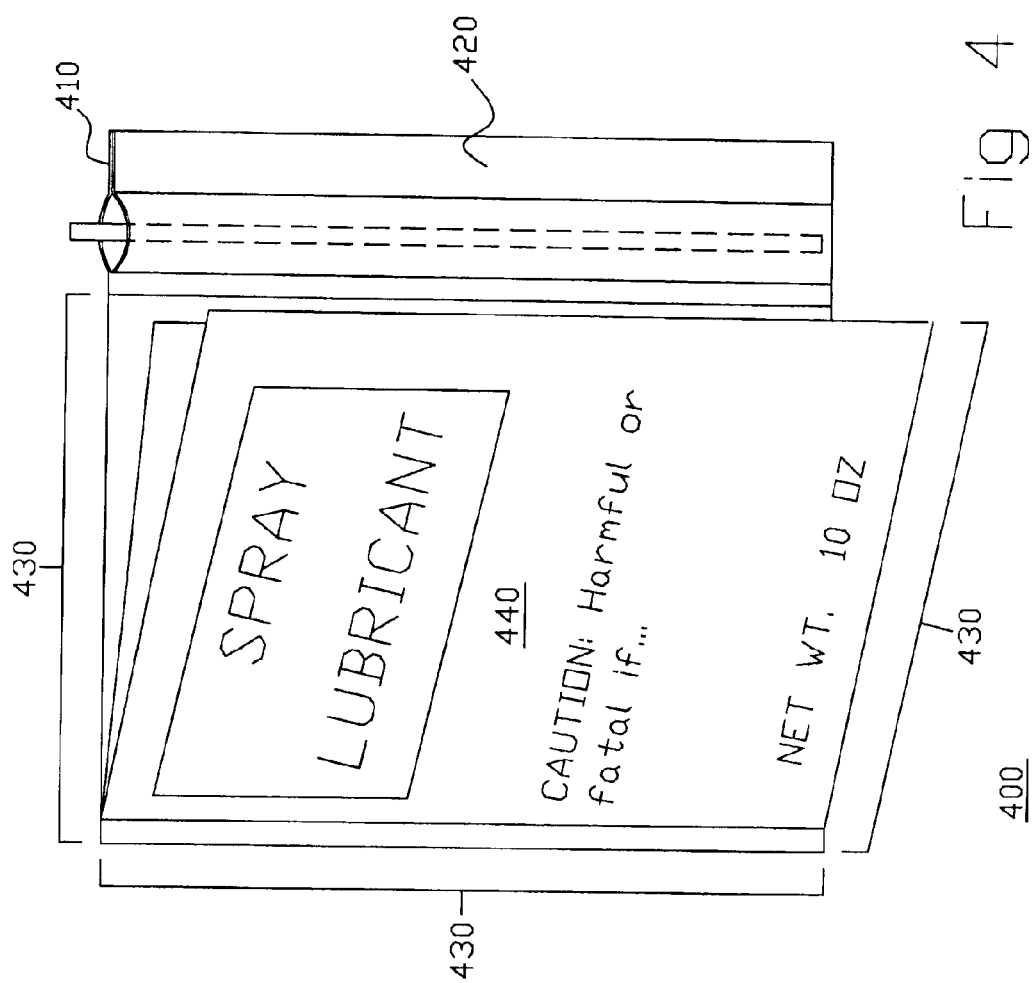

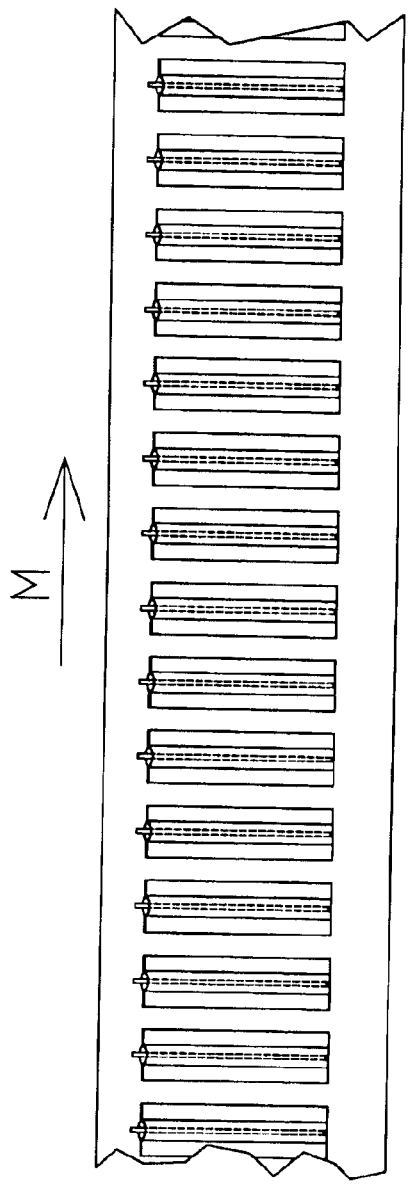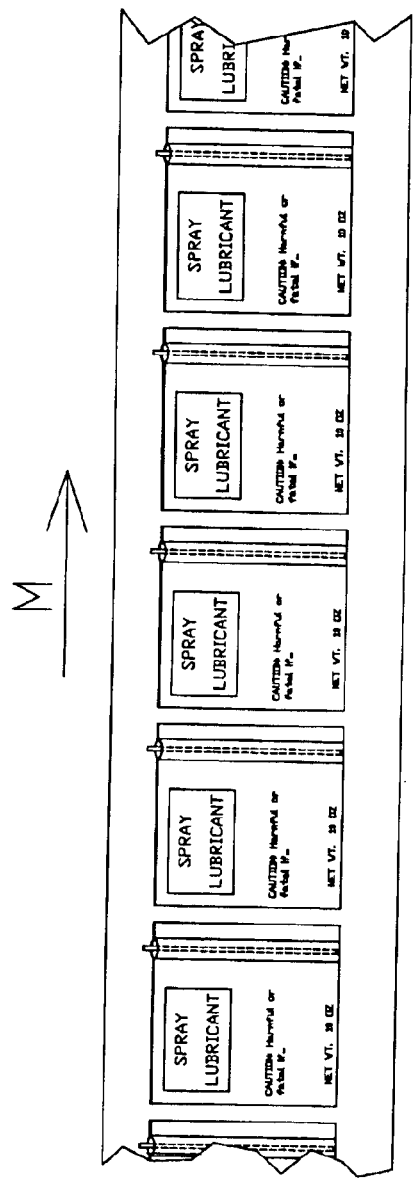

LABEL HAVING AN INTEGRAL EXTENSION TUBE AND METHOD OF MANUFACTURE THEREOF

FIELD OF THE INVENTION

The present invention relates generally to labels. The invention relates specifically to a label having an integral extension tube, for use with spray containers and the like, inter alia.

BACKGROUND OF THE INVENTION

Spray containers are well known, and have enjoyed wide commercial success. Many spray containers are capable of delivering a fine and widely dispersed "mist" of a product, which is acceptable for covering a wide surface area often, however, a directed or "pinpoint" spray is required for precise delivery or application of the product into small or restricted areas. In response to this requirement, many spray containers have provided an extension tube or "spray straw" which is inserted into a spray nozzle of the spray container. The extension tube acts to focus delivery of the product to a narrow spray diameter, thus avoiding the widely dispersed mist that would otherwise result.

An extension tube is, usually, provided to the consumer by way of simply taping it onto an exterior surface of the spray container. This taping of the tube to the container does not readily provide a means for storing the tube with the container after initial use; that is, it is difficult and cumbersome to re-tape the tube to the container. Furthermore, after several uses, an exterior surface of the tube and/or container may become coated with the product, thereby inhibiting adhesive attachment of the tape to the tube and the container. Consequently, extension tubes often are separated from spray containers and are lost, causing much aggravation to a consumer.

Therefore, there exists a need for a label having an integral extension tube, which provides easy removal of an extension tube therefrom and replacement thereinto after each use, which may be simply and inexpensively produced, and which prevents loss of the tube.

It is generally accepted and well-known in the label making arts that in-line, single pass, printing and converting processes offer the most cost-effective label production. Therefore, there also exists a need for an in-line, single pass, printing and converting process for manufacture of such a label having an integral extension tube.

SUMMARY OF THE INVENTION

An object of the present invention is to provide a label having an integral extension tube that is inexpensive and simple to produce.

Another object of the present invention is to provide a label having an integral extension tube including a primary label portion.

A further object of the present invention is to provide a label having an integral extension tube including an extended text label portion.

Yet another object of the present invention is to provide an in-line, single pass, printing and converting method of manufacture for such labels.

In accordance with the present invention, a label having an integral extension tube includes a label construction having a top ply and a base ply. The top ply and the base ply each have perimeter edges that are substantially coupled together in such a manner that a chamber is formed within the label construction, for providing an extension tube there within.

BRIEF DESCRIPTION OF THE DRAWINGS

FIG. 4 is an illustration of a label having an integral extension tube, further including an extended text label portion.

FIG. 5a is an illustration of a web of labels as shown individually in FIG. 2, manufactured in accordance with the present invention.

FIG. 5b is an illustration of a web of labels as shown individually in FIG. 3, manufactured in accordance with the present invention.

DETAILED DESCRIPTION OF THE INVENTION

Figure 1:
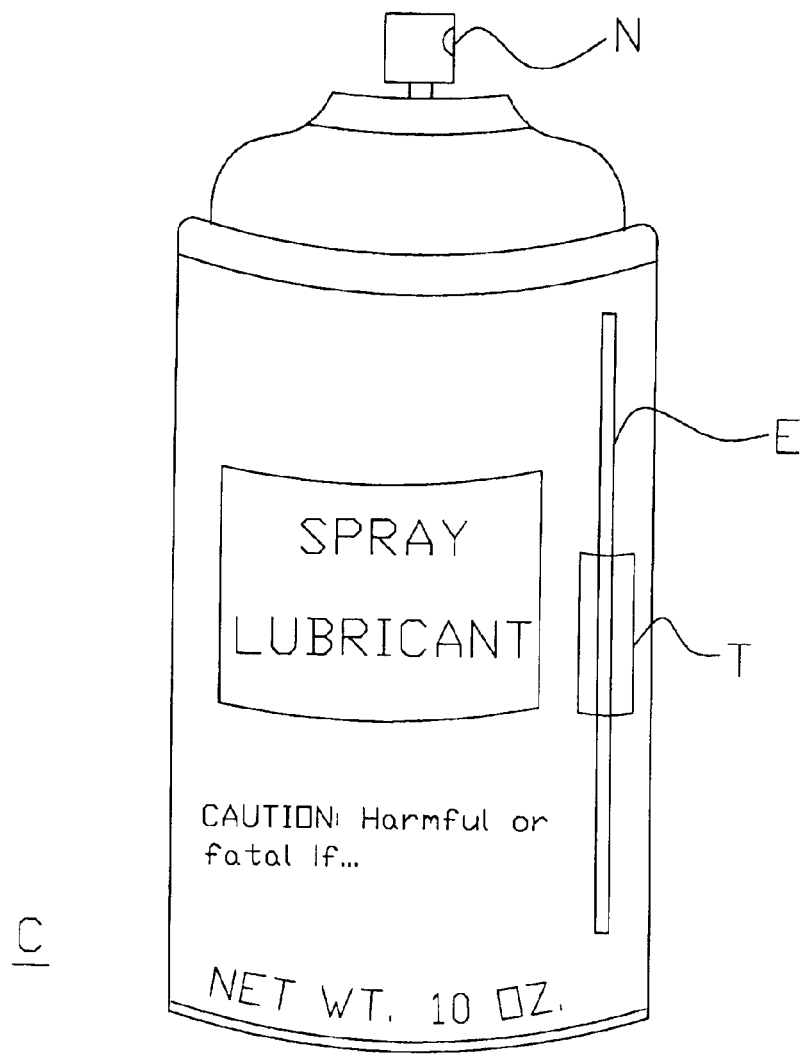
FIG. 1 is an illustration of a conventional spray container with an extension tube taped thereto.

Referring to FIG. 1, there shown is an exemplary conventional spray container C with an extension tube E removably secured thereto by way of a small piece of adhesive tape T. As is well known in use of tube E, tape T is removed at least partially from container C so that tube E may then also be removed and inserted, at one end thereof, into a spray nozzle N of container C. As used here throughout, "extension tube" is intended to be synonymous with "spray straw" or any straw-like device, and includes any device capable of delivering a focused flow of a product.

Figure 2:
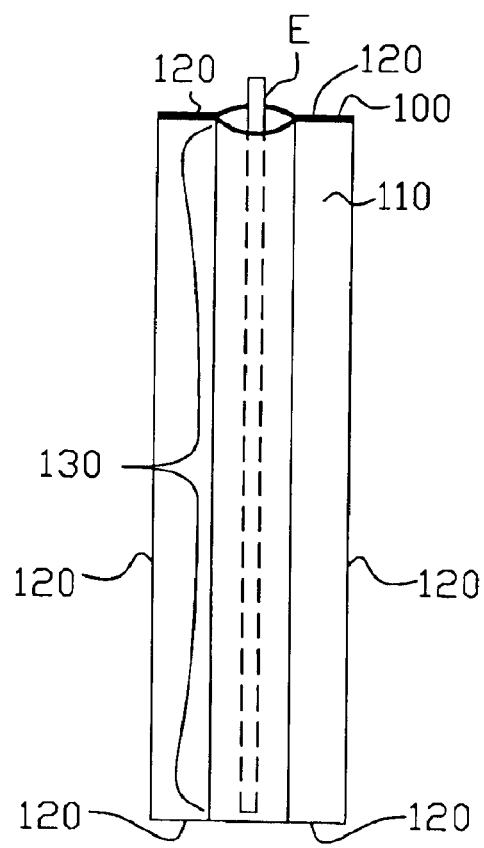
FIG. 2 is an illustration of a label having an integral extension tube, constructed in accordance with the present invention.
Figure 2A:
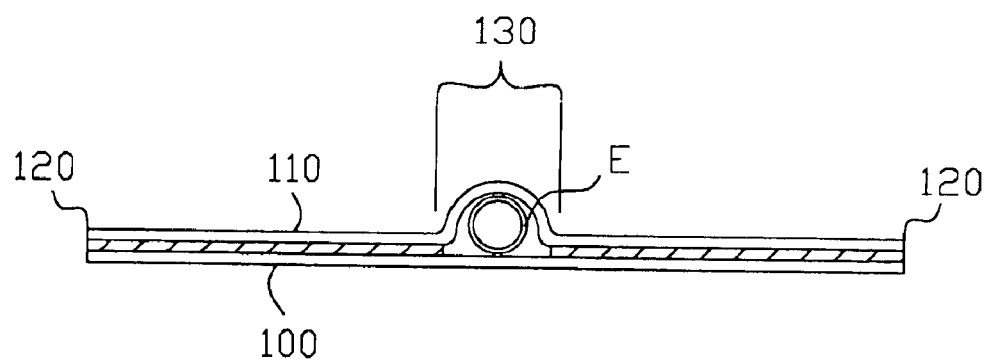
FIG. 2a is a magnified cross-sectional view of the label of FIG. 2.
Figure 2B:
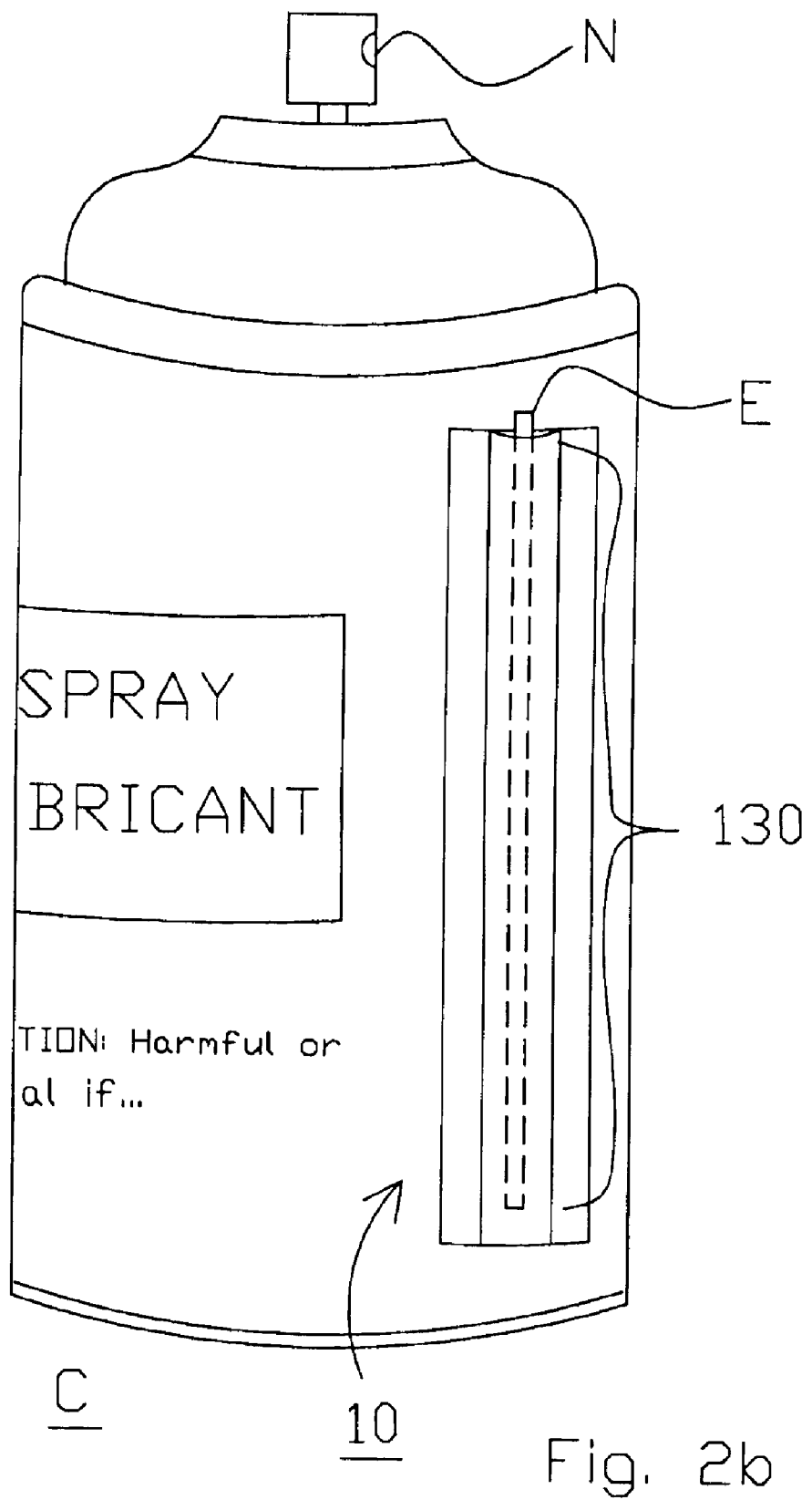
FIG. 2b is an illustration of the label of FIG. 2, shown as having been secured to the container of FIG. 1.

Referring to FIGS. 2 and 2a, there shown is an exemplary label having an integral extension tube 10, constructed in accordance with the present invention. Label 10 includes a base ply 100 and a top ply 110. Base ply 100 and top ply 110 are joined or "married" together about their corresponding perimeter edges 120 by any suitable process as known in the label making arts. The marrying of ply 100 and ply 110 about perimeter edges 120, as will be further described in manufacture of label 10, is selectively performed such that a pocket or chamber 130 is formed therewithin as shown in the figures. As may be particularly appreciated with reference to FIG. 2b, chamber 130 provides for storage and removal of tube E in use of container C, and for re-insertion thereinto after use.

It is to be appreciated that label 10 is particularly suited for use as a secondary labeling means. As used here throughout, "secondary labeling means" is intended to include, but is not limited to, labels for use with pre-printed or pre-decorated product containers (e.g., direct Litho-printed containers).

Figure 2C:
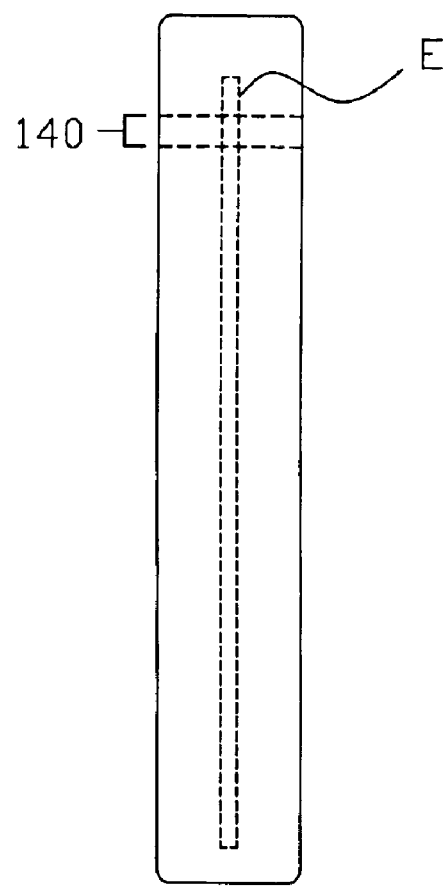
FIG. 2c is an illustration of a label having an integral extension tube, further including a perforated tear-open portion and constructed in accordance with the present invention.

In FIG. 2c, the label of FIG. 2 is depicted as including a perforated tear-open portion 140. In use of this embodiment of the label, a consumer may pull portion 140 to open the chamber containing the extension tube.

Figure 3:
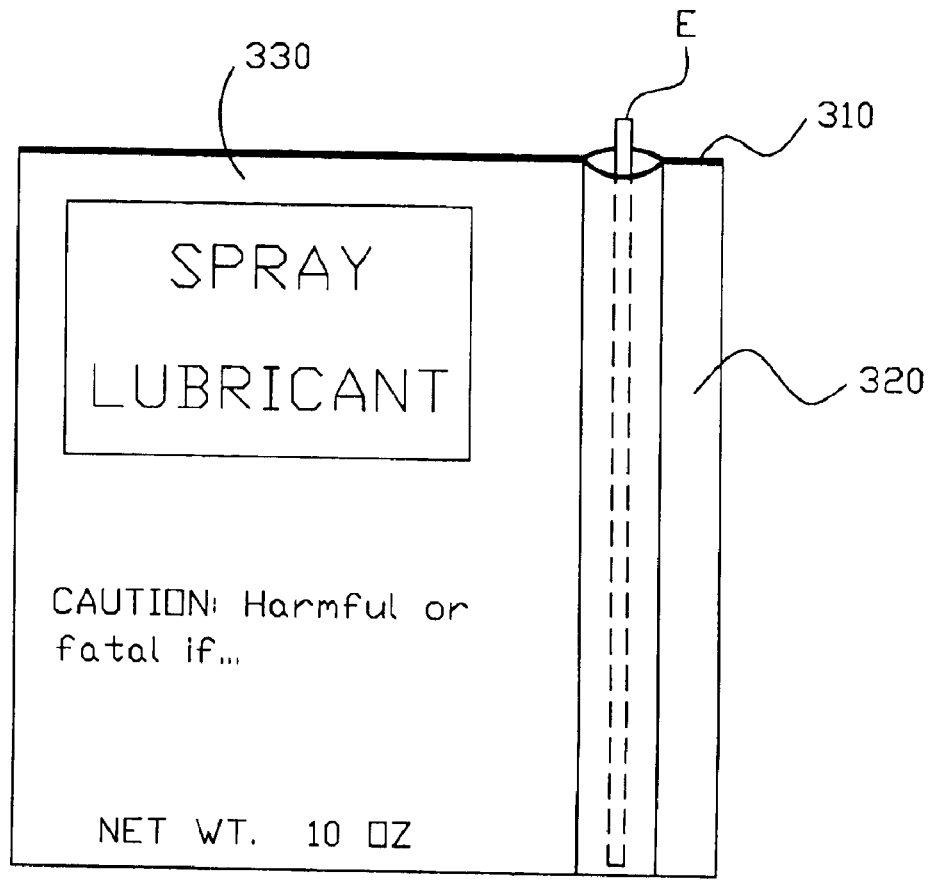
FIG. 3 is an illustration of a label having an integral extension tube, further including a primary label portion.
Figure 3A:
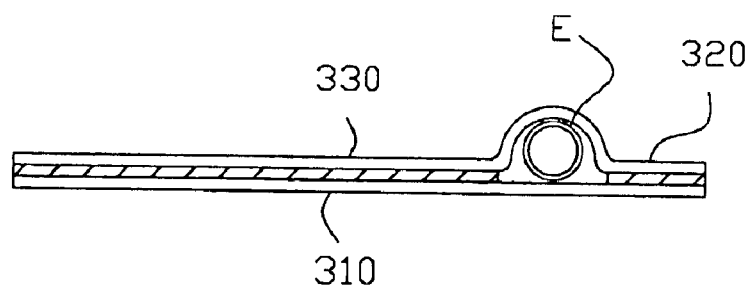
FIG. 3a is a magnified cross-sectional view of the label of FIG. 3.

Referring, now, to FIGS. 3 and 3a, another embodiment of the present invention is depicted. Therein, a label having an integral extension tube 300 includes a base ply 310, a top ply 320, and a primary label portion 330. As used here throughout, "primary label portion" is intended to include, but is not limited to, decorative and/or informative labels. As in label 10 of FIG. 2, base ply 310 and top ply 320 are married together about their corresponding perimeter edges, to form a chamber for tube E. Label portion 330 is preferably simply an extension of base ply 310, but may also be alternatively or in combination, an extension of top ply 320. Label portion 330 is also preferably capable of bearing printed images thereon.

It is to be appreciated that, like label 10, label 300 is also suited for use as a secondary labeling means.

In FIG. 4, yet another embodiment of the present invention is depicted. In this figure, a label having an integral extension tube 400 includes an extended text label portion 430. As used here throughout, "extended text" is intended to include, but is not limited to, multiple-ply type labeling such as so-called "extended text labels", "expanded content labels", "multi-ply labels", and "booklet labels", to name a few.

In this embodiment, label 400 again includes a base ply 410 and a top ply 420, along with an extended text label portion 430. As in labels 10 and 300 of FIGS. 2 and 3, respectively, base ply 410 and top ply 420 are married together about their corresponding perimeter edges, to form a chamber. Label portion 430 preferably comprises an extension of base ply 410 (like portion 330 in FIG. 3) having an extended text component 440 secured thereto. An exemplary extended text component 440 is disclosed in U.S. Pat. No. 5,264,265 issued to Kaufmann. Label portion 430 in its entirety, of course, is also preferably capable of bearing printed images thereon.

It is to be appreciated that, like labels 10 and 300, label 400 is also well suited for use as a secondary labeling means.

Figure 5:
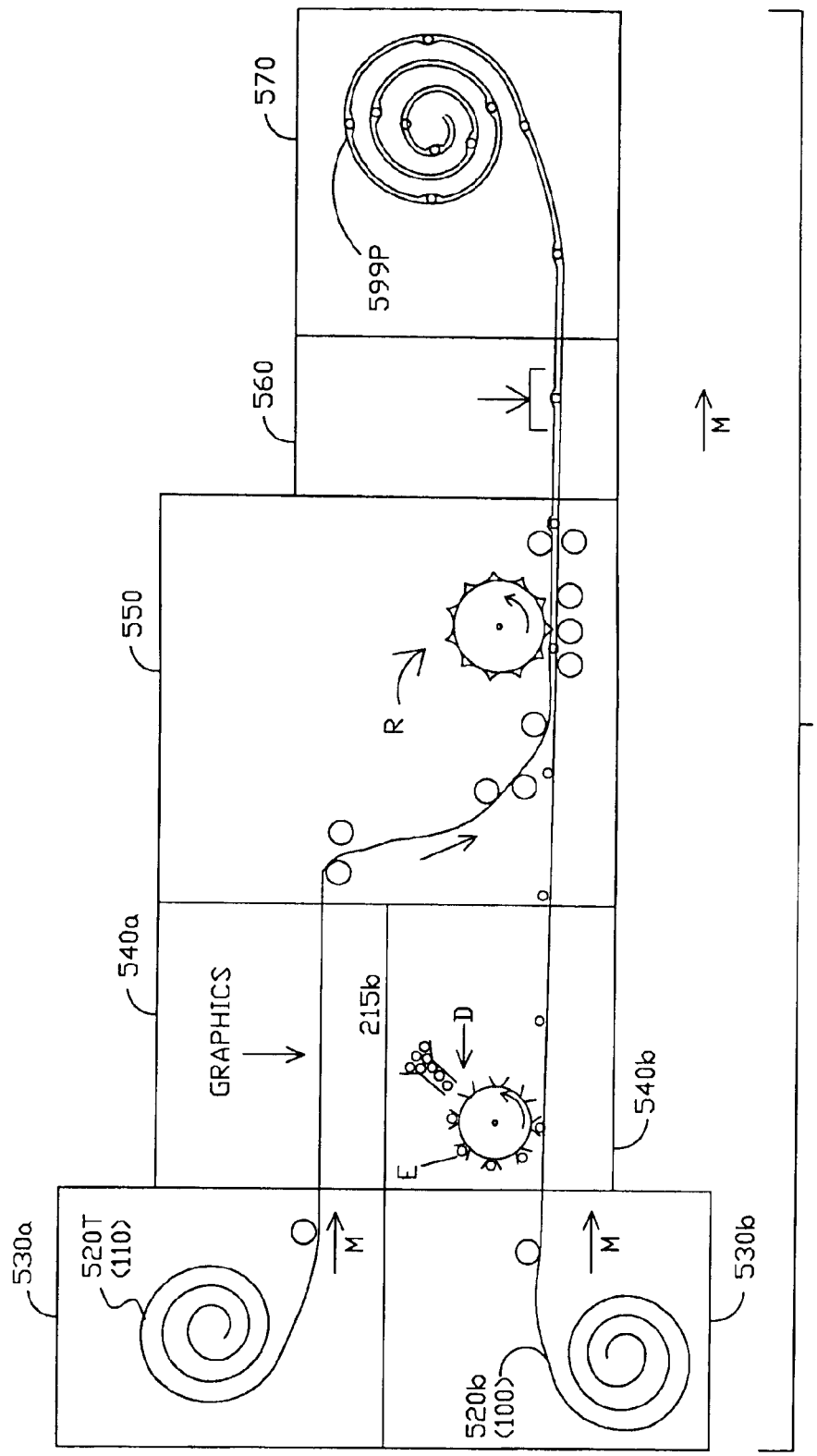
FIG. 5 is a schematic diagram of a method of manufacturing a label of the present invention.

With attention, now, to FIG. 5, there depicted in schematic fashion is an exemplary in-line web press manufacturing installation 500 including multi-unit in-line printing and converting press 510, for mass production of the afore-described labels. In this example of the present invention, the labels are of a so-called wrap type.

Multi-unit press 510 of installation 500 includes unwind units 530a and 530b, a first printing unit 540a, a tube dispenser unit 540b, a nip roller web joining unit 550, a die-cutting unit 560, and a final re-wind unit 570, as will now each be further described in construction of, for example, a web of labels as shown in FIGS. 5a–b.

It is to be understood that press 510 is selectively capable of providing a variable number of print stations for application and drying of pigmented inks, coatings, and adhesives. As understood by those of ordinary skill in the printing arts, the exemplary multi-unit press 510 may be any suitable narrow- or wide-web press such as a flexographic, letterpress, gravure, screen, or offset press. Such presses are commercially available from, for example, Comco International of Milford, Ohio, or Mark Andy Inc. of St. Louis, Mo.

As a simple example of construction of labels 10, an unsupported web 520T (top ply 110 in FIG. 2) is supplied in a conventional roll form to press 510 at unwind unit 530a, and in a lengthwise machine direction M thereto. Simultaneously, a web 520B (base ply 100 in FIG. 2) is also preferably supplied in a conventional roll form to press 510 at unwind unit 530b in lengthwise machine direction M. Webs 520T and 520B are any suitable in-line web-like materials. As used herein, "web-like materials" denotes any suitable material or combination hereof, including paper, film, polypropylene, polyethylene, polyester, polyvinylchloride, polystyrene, foil, and ethylene vinyl acetate, whether clear or opaque.

Unwind units 530a–b pass webs 520T–B, respectively, to first printing unit 540a and to tube dispenser unit 540b, respectively. At unit 540a, selected graphics are printed on top ply 110. At unit 540b, individual tubes E are indexed to meet a specific placement registration on web 520B, and are sequentially placed there onto by way of any suitable "pick-and-place" type dispenser device (generally denoted as "D" in FIG. 5).

Webs 520T–B are then passed to nip roller web joining unit 550. At unit 550, webs 520T–B are joined by way of, for example, an adhesive coating. Unit 550 includes a nip roller (generally denoted as "R" in FIG. 5) having a surface profile which acts to form the aforementioned chambers in the labels.

Married webs 520T–B then pass to die-cutting unit 560 for providing the labels with their desired final dimensions.

Married and die-cut webs 520T–B then pass to final re-wind unit 570 where the combined webs are re-wound into a supply roll of a finished product 599P carrying individual labels (as shown, for example, in FIGS. 5a–b). Finished product 599P is then made available to a customer for use in their roll-fed wrap labeling machines. Alternatively, finished product 599P may be "sheeted" for use with a sheet-fed labeling machine.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired results, or that various accessories may be added thereto.

Of course, labels of the present invention may be readily utilized with any product container where an extension tube or similar straw-like device is employed (e.g., juice drink pouches, etc.)

It is to be appreciated that any of the aforedescribed coatings and graphics may be selectively provided in any suitable combination on labels constructed according to the present invention, for a particular desired use. Specifically, it may be advantageous to employ a clear film for both label plies, so that graphics of pre-printed or pre-decorated product containers are not obscured.

It is also to be understood in general that any suitable alternatives may be employed to provide the label having an integral extension tube of the present invention, along with its manufacturing scheme.

Lastly, the choice, of course, of compositions, sizes, and strengths of various aforementioned components of the labels of the present invention are all a matter of design choice depending upon intended uses thereof. Although the labels have been depicted as being no larger than containers C, they could be any desired size.

Accordingly, these and other various changes or modifications in form and detail of the present invention may also be made therein, again without departing from the true spirit and scope of the invention as defined by the appended claims.

What is claimed is:

1. A label having an integral extension tube, comprising:
a label construction including a top ply and a base ply, said top ply and said base ply each having perimeter edges,
wherein selected portions of said perimeter edges of each said ply are substantially coupled together in such a manner that a longitudinal chamber is formed, said chamber (i) being open at one end within said label construction, and (ii) containing an extension tube for an aerosol spray container.

2. The label having an integral extension tube of claim 1, wherein (i) said perimeter edges are sealed such that said longitudinal chamber is closed, and contains said extension tube, and
(ii) said top ply includes a perforated tear-open portion in communication with said chamber, to provide an opening for said chamber.

3. A label having an integral extension tube, comprising:
a label construction including a top ply and a base ply, said top ply and said base ply each having perimeter edges; and
a primary label portion formed from said base ply,
wherein selected portions of said perimeter edges of each said ply are coupled together to form a longitudinal chamber within said label construction, said chamber (i) being open at one end, and (ii) containing an extension tube for an aerosol spray container.

4. The label having an integral extension tube of claim 3, wherein (i) said perimeter edges are sealed such that said longitudinal chamber is closed, and contains said extension tube, and
(ii) said top ply includes a perforated tear-open portion in communication with said chamber, to provide an opening for said chamber.

5. The label having an integral extension tube of claim 3, wherein said primary label portion is formed from said top ply.

6. The label having an integral extension tube of claim 4, wherein said primary label portion is formed from said top ply.

7. A label having an integral extension tube, comprising:
a label construction including a top ply and a base ply, said top ply and said base ply each having perimeter edges; and
an extended label portion formed from said base ply,
wherein selected portions of said perimeter edges of each said ply are coupled together to form a longitudinal chamber within said label construction, said chamber (i) being open at one end, and (ii) containing an extension tube for an aerosol spray container.

8. The label having an integral extension tube of claim 7, wherein (i) said perimeter edges are sealed such that said longitudinal chamber is closed, and contains said extension tube, and (ii) said top ply includes a perforated tear-open portion in communication with said chamber, to provide an opening for said chamber.

9. A method of manufacturing a label having an integral extension tube, comprising the steps of:
providing a first web material comprising a base ply and a second web material comprising a top ply, said base ply and said top ply each having perimeter edges;
coupling selected portions of said web materials together about their said perimeter edges, to form a longitudinal chamber within said label; and
providing an extension tube for an aerosol spray container within said chamber.

10. The method of claim 9, further comprising the steps of:
sealing said perimeter edges to form a closed longitudinal chamber containing said extension tube; and
providing a perforated tear-open portion in said top ply, in communication with said chamber to provide an opening therefor.

* * * * *

UNITED STATES PATENT AND TRADEMARK OFFICE
CERTIFICATE OF CORRECTION

PATENT NO. : 6,881,459 B2
DATED : April 19, 2005
INVENTOR(S) : Joseph D. Franko, Sr.

It is certified that error appears in the above-identified patent and that said Letters Patent is hereby corrected as shown below:

Column 1,
Line 17, "area often," should read -- area. Often, --.

Signed and Sealed this

Seventh Day of June, 2005

JON W. DUDAS
*Director of the United States Patent and Trademark Office*